April 28, 1970 R. H. NORMAN 3,509,442
CURRENT PULSE SHAPER INCLUDING A STORAGE MEANS HAVING
A CHARGING PATH AND A PLURALITY OF DISCHARGING PATHS
OF DIFFERING TIME CONSTANTS
Filed Feb. 19, 1968

INVENTOR
ROY H. NORMAN
BY Thomas E. Schatzel
ATTORNEY

United States Patent Office 3,509,442
Patented Apr. 28, 1970

3,509,442

CURRENT PULSE SHAPER INCLUDING A STORAGE MEANS HAVING A CHARGING PATH AND A PLURALITY OF DISCHARGING PATHS OF DIFFERING TIME CONSTANTS

Roy H. Norman, Palos Verdes, Calif., assignor to Ampex Corporation, Redwood City, Calif., a corporation of California Filed Feb. 19, 1968, Ser. No. 706,523
Int. Cl. H02j *1/04*
U.S. Cl. 320—1 9 Claims

ABSTRACT OF THE DISCLOSURE

A pulse shaping network adapted to receive a timing signal and provide responsive output pulses having a discontinuous rise time component when operating in a resistive load. The output pulse may be received by an underdamped reactance load with the resulting pulse through the inductive part of the load having a substantially linear rise time. The circuit network when associated with a mass core memory, may serve as a word current source receiving a timing pulse and providing a responsive drive pulse of continuous substantially linear rise within a desired rise time to drive lines offering an inductive load to the network in conjunction with a capacitive component resulting from the drive matrix.

BACKGROUND OF THE INIVENTION

Magnetic storage devices have found wide use in electronic computer circuits. Such devices typically include toroidal magnetic cores arranged in rows and columns to form a core memory array or apertured sheets of ferrite material wherein each aperture functions in much the same manne as a separate core. The core materials preferably have a substantially rectangular hysteresis characteristic and may be switched to different parts of such characteristic by the application of current pulses of certain polarities and magnitude to conductors threaded through the cores. Binary data is stored and processed by means of the inner action between the electronic circuitry in the magnetic core elements. Information is processed to the array by electronic switching circuitry for addressing individual or groups of core elements. For any given read or write operation, a selected number of core elements receive electrical signals on conductors associated with the elements and the remainder of the core elements in the memory array are inactive. For example, in a coincident current configuration each row of cores has a common drive line or address line. When one row and one column is selected, the core at the intersection receives the two pulses to place it in a saturation state depending on the polarity of the pulses. The individual drive currents must not in themselves be sufficient to drive the core into saturation but be of such magnitude that when combined with the driver curent in the other drive line the common core responds. Thus, the magnetic core storage devices require precise control of the current value and critical timing.

The present invention relates to a pulse shaping circuit which in one application has proven highly satisfactory and beneficial as a word current source to the drive lines in mass core memory structures. Core memories invariably represent a reactive load to a current driving source and in mass memory arrangements where there are a large number of cores, frequently in the order of twenty million, the shape of the applied pulse is critical. Each address line is highly reactive due to length and inner parasitic capacitance with other lines and components. Each line is commonly several feet long and carries several hundred cores. In addition, the drive switch matrix is substantial. Accordingly, the lines have oscillatory tendencies and to read or write information the reactance must be taken into consideration to pulse a current of controlled magnitude and polarity through the lines linking a selected core.

The high reactance of the mass memory tends to cause a pulse having a short rise time to overshoot, frequently resulting in erroneous switching. There have been various available approaches to overcome overshoot in such systems. For example, the rise time of the driving current pulse can be increased relative to the oscillatory time constant. However, the cores must be switched and to realize good voltage output from the core, which voltage is inversely proportional to the rise time of the current, there is a maximum tolerable rise time. For example, with a twenty-two (22) mil (OD) lithium material core, the rise time preferably should not exceed approximately 200 nanoseconds.

Accordingly, it is desirable to have a word current source providing a pulse of a relatively short rise time but at the same time having a slope coinciding with a pulse having a longer rise time. The shaping network of the present invention provides such a pulse automatically.

SUMMARY OF THE INVENTION

The network of the present invention provides a control over the current wave-shape in an inductive-capacitance load. In mass core memories shaping of the current pulse from the current source is beneficial for overcoming the underdamped characteristics of the drive lines. The present network has proven highly beneficial in such applications. Assuming a purely resistive load, the present current source network providing a pulse of a discontinuous rise time. The discontinuity in the rise time is compensated for by the underdamped inductance-capacitance characteristics of the drive matrix load such that the pulse within the line has a continuous substantially linear slope. The net rise time may be optimumly adjusted for good voltage response and minimized overshoot.

The network herein may be viewed as including a timing circuit stage adapted for receiving an input timing signal, a current source stage and a shaping circuit stage acting interdependently. The shaping circuit responds to the conductive state of the timing circuit and the current source responds to the shaping circuit. The shaping circuit includes a potential storage means, e.g., a storage capacitor. During the initial conductive state the shaping circuit provides a discharge path to the storage means of a first resistance-capacitance (RC) time constant. The RC time constant is reflected in the rise time of an output pulse from the current source. During the linear portion of the initial output pulse the shaping circuit switches in a different resistance-capacitance (RC) value in the discharge path to provide a second time constant and alter the slope of the output pulse. Proper selection of the first and second time constants in view of the impedance of the line provides a drive pulse to the line having a substantially linear rise time. The first and second time constants may be adjusted to be of optimum value to realize the best voltage output from the selected core while providing minimal overshoot.

The shaping circuit may preferably be designed such that the switch over from the first to second time constant occurs automatically at a desired selected point. The resistance-capacitance network setting the time constant may be such that the resistance portion includes a pair of resistance branches interconnected through a unidirectional diode. The diode is biased in one direction during the desired time for the first time constant. The second time constant is realized when the diode becomes biased in the opposite direction and the net resistance of the parallel network altered.

DESCRIPTION OF THE PREFERRED EMBODIMENT

Figure 1:
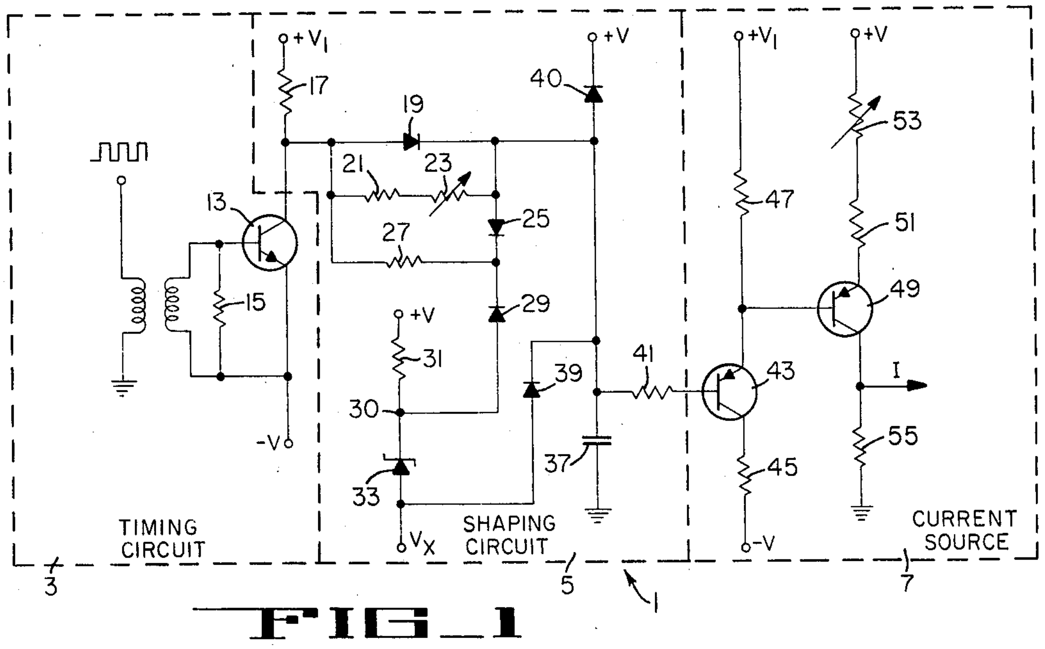
FIG. 1 is a schematic circuit diagram of a pulse shaping network according to the present invention.

Referring to FIG. 1, there is schematically illustrated a preferred embodiment of the pulse shaping network of the present invention and referred to by the general reference character 1. The network 1, in broad terms, includes a timing circuit 3, a shaping circuit 5 and a current source circuit 7. The network 1, as illustrated, is adapted for providing positive current pulses in reference to ground but as will hereinafter be described, only minor modifications need be made to make it negative oriented. The timing circuit 3 is adapted to receive an input timing signal, for example, a square wave pulse signal. The current source circuit 7 provides a current output pulse responsive to the timing signal. The shaping circuit 5 responds to the conductive state of the timing circuit 3 and includes a resistance-capacitance (RC) arrangement which affects the slope and rise time of the voltage control signal applied to the current source circuit 7. Consequently, the RC values affect the characteristics of the output current pulse.

Viewing the network 1 in more detail, the timing circuit 3 includes an input coupling transformer 9, the primary of which receives the square wave input pulse. The secondary of the transformer 9 extends across the base and emitter of an NPN transistor 13. The transformer secondary is also in parallel with a damping resistor 15. The emitter of the transistor 13 extends to a negative source —V while the collector extends to a positive potential source $+V_1$ through a collector resistor 17. The on and off conductive states of the timing circuit 3 is determined by the input pulse signal. As illustrated, the transistor 13 acts as an electronic switch assuming a saturation or on conductive state upon the receipt of a positive timing pulse.

The shaping network 5 includes a first unidirectional conducting device in the form of a diode 19, the anode of which is common to the collector of the transistor 13. In parallel with the diode 19 is a first resistance leg including a fixed resistor 21 and a variable resistor 23. Common to the junction of one side of the first leg and the cathode of the diode 19 is a second unidirectional conducting device in the form of a diode 25, the anode of which joins the junction. The cathode of the diode 25 extends to a resistive element 27 and to a third unidirectional conducting device in the form of a diode 29. The cathode of the diode 29 joins the junction of the resistor 27 and cathode of the diode 25. The anode of the diode 29 extends to a junction 30 of a resistance element 31 and a Zener diode 33. The resistor 31 extends to a +V potential and the anode of the Zener diode 33 extends to a potential source V*x* which may be variable such that the potential across the resistor 31 and Zener 33 coincides with the algebraic sum of $Vx+V$. The Zener diode 33 and resistor 31 are arranged such that the common junction 30 provides a voltage bias reference. As will be hereinafter further described, the bias reference value affects the point at which the time constant of the shaping circuit changes.

The junction of the diodes 19 and 25 is also common to a potential storage means illustrated in the form of a charging capacitor 37. Also, common to the junction is a fourth unidirectional conducting device in the form of a diode 39 with the cathode tied to the junction. The diode 39 serves as a clamping means to prevent the capacitor 37 from discharging below a select value. The anode of the diode 39 extends to the source V*x* and as such V*x* is the maximum degree to which the capacitor 37 can discharge. The common junction also extends to a fifth unidirectional conducting device in the form of a diode 40, the cathode of which is common to the +V source and the anode common to the capacitor 37. The other side of the capacitor 37 extends to ground potential. The output control signal from the shaping circuit 5, is derived through a resistive element 41, one terminal of which is common to the junction of the capacitor 37, the diode 25 and the diode 39.

The current source circuit 7 is adapted to receive a voltage control signal from the shaping circuit 5 and provide an output current signal of similar waveform. As illustrated, the current source circuit 7 includes a pair of emitter follower stages including a first current valve in the form of a PNP transistor 43 with the base joining the resistor 41, the collector joining the —V source through a collector resistance element 45, and the emitter joining the $+V_1$ source through an emitter bias resistor 47. The emitter of the transistor 43 extends to the base of a PNP transistor 49 which is part of the second emitter follower stage. The emitter of the transistor 49 extends to the +V source through a resistance network having a fixed resistor 51 and a variable resistor 53. The collector of the transistor 49 extends to the output terminal and through a load resistance 55 to ground potential.

Figure 2:
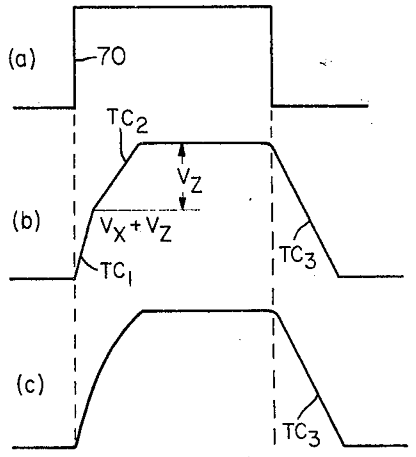
FIG. 2 illustrates the wave shape of the pulses (*a*) received by the circuitry of FIG. 1, (*b*) provided by the circuitry of FIG. 1 if operated into a resistive load, and (*c*) provided by the circuit of FIG. 1 when operating into an reactive load.

In FIG. 2 idealized waveforms are illustrated at various stages in the network 1. FIG. 2(*a*) illustrates an input pulse 70 received at the primary of the coupling transformer 9. The transistor 13 serves as a switch responsive to the input pulse. During the off state of the transistor 13 in the absence of a positive pulse 70, the diode 19 is forward biased and provides a low resistance charge path to the capacitor 37 bypassing the resistors 21 and 23. The input pulse 70 causes the transistor 13 to saturate and conduct.

When the transistor 13 initially assumes the on conductive state, the charging capacitor 37 is at +V volts plus the drop across the diode 40, the value to which it charged when the transistor 13 was in an off conductive state. With the transistor 13 in an on conductive state, the diodes 19, 29 and 40 are back biased while the diode 25 is forward biased. The capacitor 37 tends to discharge through the path including the series combination of the resistors 21 and 23 in parallel with the resistor 27, and the saturated transistor 13 to the source —V. Acordingly, the voltage on the base of the transistor 43 decreases from a positive value at a rate dependent upon the time constant $TC_1$ of the combination of the capacitor 37 and the resistors 21, 23 and 27. The capacitor discharges from the initial voltage value to $Vx+Vz$ with Vz being the potential across the Zener diode 33 and $Vx+Vz$ the potential at the junction 30.

When the potential of the capacitor 37 decreases to $Vx+Vz$, the diode 25 becomes back biased. Thereafter the discharge path of the capacitor 31 does not include the resistor 27 but only the resistors 21 and 23. The time constant changes to a value $TC_2$ providing a slower rate of rise. Accordingly, the slope of the voltage signal to the transistor 43 assumes a decreased value. The change in time constant is illustrated by the waveform of FIG. 2(*b*) with the knee representing the point when the discharge voltages reach $Vx+Vz$, $TC_1$ the slope during the first time constant and $TC_2$ the slope during the second time constant.

It may be noted, the potential at which the diode 25 becomes back biased is dependent upon hte rating of the Zener diode 33. However, by utilizing a variable Vx, the potential at the junction 30 can be varied. This may be selected so as to occur during the first order of the discharge path thereby realizing a substantially linear signal during $TC_1$. The $Vx$ value in turn determines the total extent to which the capacitor 37 discharges. The voltage difference between the knee and top of the output pulse is set by the potential across the Zener diode 33. This is illustratively designated in waveform of FIG. 2(*b*) as $Vz$ to illustrate that the value is dependent upon the rating of the Zener diode 33. If it is desirable to maintain the value during $TC_1$ at a fixed invariable value $Vx$, the resistor 31 and diode 33 may be interchanged.

The capacitor 37 continues to discharge until the diode 39 becomes forward biased at which point the voltage at the resistor 41 stabilizes. The diode 39 clamps the voltage to the value $Vx$. Thereafter the output is at its flat level top and stays substantially flat until the transistor 13 is placed in a non-conductive state. The capacitor then recharges to the value $+V$ plus the drop across the diode 40. The recharge time constant $TC_3$ is dependent upon the value of the capacitor 37 and the resistor 17.

The current source circuit 7 including the two emitter followers responds to the voltage control signal at the charging capacitor 37. Accordingly, it provides an output current signal responsive to the voltage signal at the input and of the same shape. Thus, the waveform of FIG. 2(*b*) illustrates both the shape of the voltage at the base of the transistor 43 and the output current. FIG. 2(*b*) illustrates such wave shape when the network 1 operates into a purely resistive load. However, for reactive loads the wave shape is altered according to the reactance values. FIG. 2(*c*) illustrates the wave shape in the inductive portion of a reaction load of a word line in a mass core memory. It may be noted that the net rise slope is substantially linear.

The final value and wave shape of the output current may be controlled by varying the source $Vx$. The variable resistor 23 may be adjusted to vary both rise times $TC_1$ and $TC_2$. Also, the variable resistor 53 provides a means for adjusting the output current. Accordingly, the variable components $Vx$, resistor 23 and resistor 53 allow for fine adjustment for the particular load. It may be noted that though the rise time is exponential in nature, by selecting the component values such that $TC_1$ and $TC_2$ are limited to the first order rise, the rise time portions are substantially linear.

Figure 3:
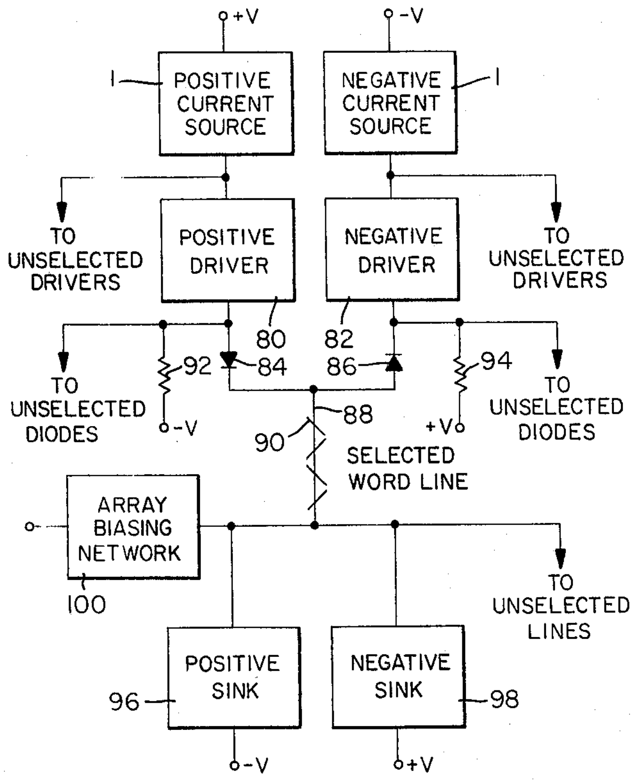
FIG. 3 illustrates a block diagram of a portion of a mass core memory network including the circuitry of FIG. 1.

FIG. 3 illustrates diagrammatically the pulse shaping network 1 of the present invention as incorporated in a mass core memory. The network 1 serves as word current sources. The diagram illustrates the circuitry surrounding a selected word line in which the cores are arranged in an anticoincidence scheme. A two diode/line selection, employing both positive and negative current sources 1 is used. A positive driver switch network 80 is common to the positive word curent source 1 and a negative driver switch 82 is common to the negative word current source 1. The word sources 1 may also extend to unselected driver network. The output of the positive driver 80 extends to the anode of a diode 84 and unselected diodes. The negative driver 82 extends to the cathode of a diode 86 and unselected diodes. The drivers 80 and 82 are biased by appropriate biasing means illustrated in the form of resistors 92 and 94, respectively, extending to the $-V$ and $+V$ sources. The selected word line 90 extends to a positive sink switch network 96 and a negative sink switch network 98, which are respectively tied to the $-V$ and $+V$ sources. An appropriate array biasing network 100 is included for back biasing the diodes 84 and 86.

In operation the selected driver 80 or 82 and sink 96 or 98 are switched on at the beginning of a memory cycle. This enables the charging current, resulting from movement of the array through a voltage excursion, to be fully dissipated before the word selection current is switched on. This does not result in loss of cycle time, since a delay is mandatory for sensing purposes. The current sources 1 are switched and provide a shaped pulse of current to the selection matrix as previously described.

The capacitance of the unselected drivers and the inductance of the selected word line result in an under-damped inductance-capacitance circuit. This would result in a current overshoot within the selected word line if no compensation were provided. However, the pulse shaping circuit 1 as a driver source minimized the overshoot and at the same time maintained the rise time to an adequate value to realize good output voltage from the cores.

In FIG. 3 the current source 1 is designated as both positive and negative. In FIG. 1 the circuit diagram for a positive oriented source is shown. The negative oriented circuit is the same except that modifications are made for the network to operate from the opposite polarity. The emitter-follower stages may include NPN transistors and the polarity of the voltage sources reversed over that shown in FIG. 1.

What is claimed is:

1. A pulse shaping network comprising in combination:

timing circuit means adapted to receive an input timing pulse, the timing means assuming an on or off conductive state responsive to the state of the input timing pulse;

shaping circuit means for providing a shaped control signal responsive to the conductive state of the timing circuit means, the shaping circuit including a potential storage means having a charging path and a plurality of discharging paths of differing time constants, the discharge paths being selected responsive to the net charge on the potential storage means and the charging path being bypassed during the on conductive state of the timing circuit means; and a current source responsive to the control signal and providing a current pulse of a shape responsive to the shape of the control signal.

2. The network of claim 1 in which the potential storage means is in the form of a storage capacitor charging and discharging responsive to the conductive state of the timing circuit and the control signal is responsive to the net charge of the capacitor, said capacitor charging during the off conductive state of the timing circuit.

3. The network of claim 2 in which:

said capacitor extends to a charging source through a first unidirectional conducting device and to the timing circuit through a plurality of discharging paths, said first unidirectional conducting device being forward biased during the off state of the timing circuit and back biased during the on state of the timing circuit; the shaping circuit includes biasing means responsive to the net potential on said capacitor for opening or blocking individual discharge paths dependent on the net capacitor charge.

4. The network of claim 3 in which the discharging paths include a pair of resistive paths tied in common at one junction and joined at the other junction through a second unidirectional conducting device, biasing means for biasing said second unidirectional conducting device in one polarity during a first discharging state of the capacitor and in the other polarity during a second discharging state of the capacitor, whereby during one discharging state both resistive paths provide a discharge path and during the other discharging state only one resistive path provides a discharge path.

5. The network of claim 4 in which the biasing means includes a Zener diode joined in series with a bias resistor across a bias potential source, said second unidirectional conducting device extending to the junction of the Zener diode and the bias resistor through a third unidirectional conducting device connecting in opposing polarity to the second unidirectional conducting device.

6. The network of claim 5 in which the resistance values of the discharging paths are variable and the bias potential is variable whereby the time constants of the discharge paths may be varied and the duration of the discharging states is variable.

7. The network of claim 6 in which the shaping circuit further includes clamping means for limiting the maximum degree of discharge of said storage capacitor.

8. The network of claim 7 in which the clamping means includes a fourth unidirectional conducting device extending between the capacitor and a source means of a potential corresponding to the desired degree of discharge.

9. A word current source for driving a line of magnetic cores and providing pulses of substantially linear rise time for said drive lines of the memory to minimize reactive effects comprising, in combination:

timing circuit means adapted to receive an input data timing pulse, the timing means assuming an on or off conductive state responsive to the input data pulse;

shaping circuit means for providing a control signal responsive to the conductive state of the timing circuit means, the shaping circuit including a storage capacitor having a single charge path and a plurality of discharge paths of differing resistive value, the discharge paths being selected responsive to the net charge on said storage capacitor and the resistive values being selected in accordance with the reactive value of lines of a core memory to be driven, whereby the net rise time of the control signal is discontinuous with the discontinuity occuring responsive to a change in the discharge paths;

a current source responsive to the control signal and providing a current pulse to a selected driving line of a shape responsive to the shape of the control signal.

References Cited

UNITED STATES PATENTS

| | | | |
|---|---|---|---|
| 3,063,008 | 11/1962 | Grady | 320—1 X |
| 3,134,916 | 5/1964 | Sanford | 307—263 X |
| 3,364,366 | 1/1968 | Dryden | 307—263 |

TERRELL W. FEARS, Primary Examiner

H. L. BERNSTEIN, Assistant Examiner

U.S. Cl. X.R.

307—263, 270